(12) United States Patent
Brodish

(10) Patent No.: US 10,645,249 B1
(45) Date of Patent: May 5, 2020

(54) THREE DIMENSIONAL SCANNER ASSEMBLY

(71) Applicant: David Brodish, Hermitage, PA (US)

(72) Inventor: David Brodish, Hermitage, PA (US)

( * ) Notice: Subject to any disclaimer, the term of this patent is extended or adjusted under 35 U.S.C. 154(b) by 0 days.

(21) Appl. No.: 16/419,102

(22) Filed: May 22, 2019

(51) Int. Cl.
*H04N 1/06* (2006.01)

(52) U.S. Cl.
CPC ......... *H04N 1/0607* (2013.01); *H04N 1/0692* (2013.01)

(58) Field of Classification Search
CPC ...... H04N 1/06; H04N 1/0607; H04N 1/0692; H04N 1/124
See application file for complete search history.

(56) References Cited

U.S. PATENT DOCUMENTS

| 4,575,215 | A | | 3/1986 | Ariyama | |
|---|---|---|---|---|---|
| 5,235,382 | A | | 8/1993 | Nehrbass | |
| 5,450,173 | A | | 9/1995 | Bekanich | |
| 5,894,529 | A | | 4/1999 | Ting | |
| 6,122,481 | A | * | 9/2000 | Rusnack | G03G 15/605 358/474 |
| 6,408,162 | B1 | * | 6/2002 | Sheng | G03G 15/605 399/380 |
| 9,967,415 | B2 | * | 5/2018 | Yue | H04N 1/00551 |
| 2006/0239730 | A1 | * | 10/2006 | Fei | H04N 1/00519 399/380 |
| 2016/0185047 | A1 | | 6/2016 | Windau | |

* cited by examiner

*Primary Examiner* — Kent Yip

(57) ABSTRACT

A three dimensional scanner assembly for producing a two dimensional print of a three dimensional object includes a scanning panel that is positioned on a copying machine. The scanning panel is comprised of a resiliently flexible material. In this way the scanning panel can conform to the curvature of a rounded or otherwise bulky object thereby facilitating the copying machine to scan a majority of an outer surface of the rounded or otherwise bulky object. Thus, the copying machine is facilitated to reproduce a two dimensional print of a three dimensional object in a single scan. A lid panel is positioned on a scanning lid of the copying machine and the lid panel is positioned on top of the object that is placed on the scanning panel.

9 Claims, 4 Drawing Sheets

US 10,645,249 B1

THREE DIMENSIONAL SCANNER ASSEMBLY

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to scanner devices and more particularly pertains to a new scanner device for producing a two dimensional print of a three dimensional object.

BRIEF SUMMARY OF THE INVENTION

An embodiment of the disclosure meets the needs presented above by generally comprising a scanning panel that is positioned on a copying machine. The scanning panel is comprised of a resiliently flexible material. In this way the scanning panel can conform to the curvature of a rounded or otherwise bulky object thereby facilitating the copying machine to scan a majority of an outer surface of the rounded or otherwise bulky object. Thus, the copying machine is facilitated to reproduce a two dimensional print of a three dimensional object in a single scan. A lid panel is positioned on a scanning lid of the copying machine and the lid panel is positioned on top of the object that is placed on the scanning panel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
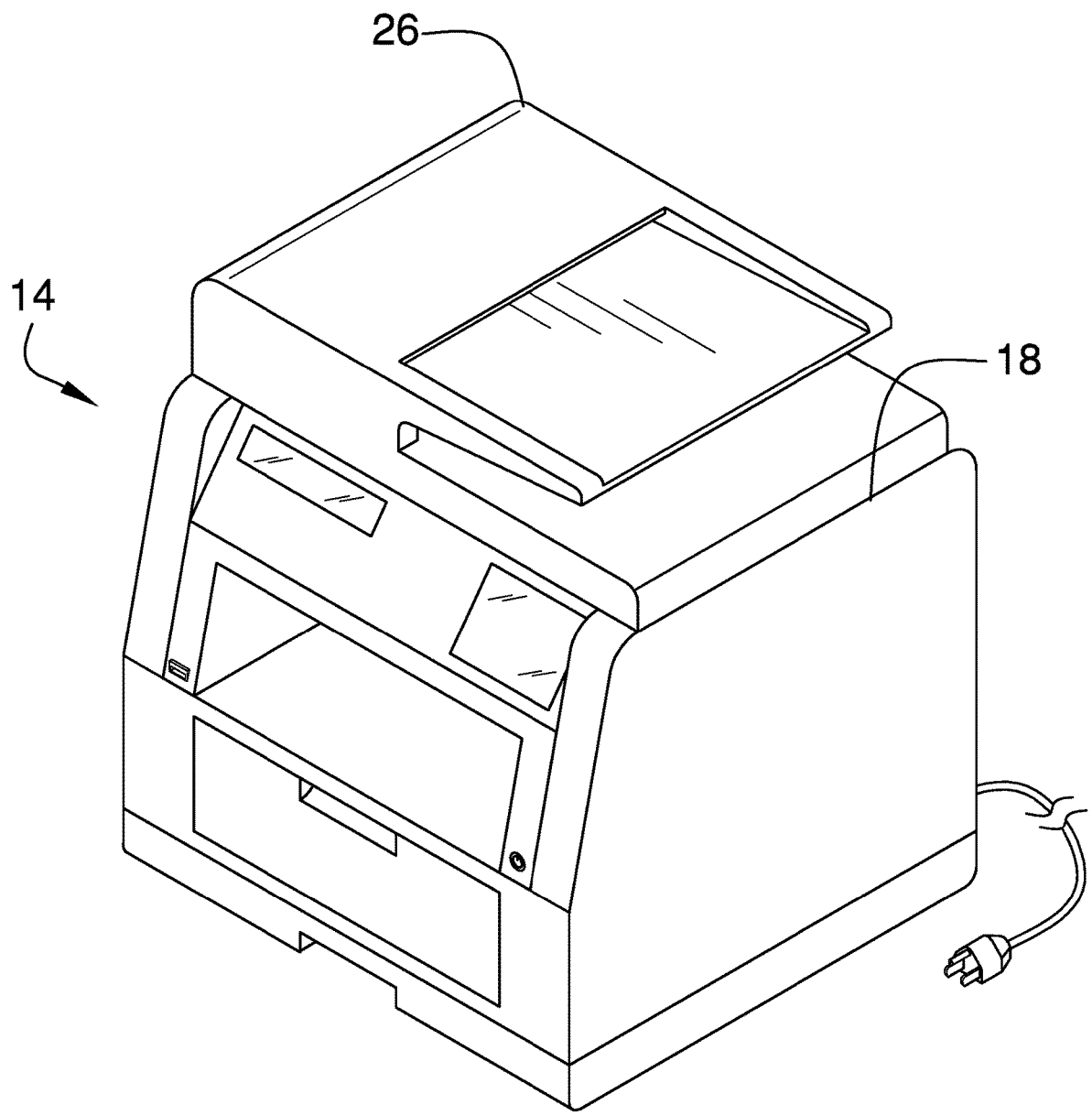
FIG. 1 is a front perspective view of a three dimensional scanner assembly according to an embodiment of the disclosure.
Figure 2:
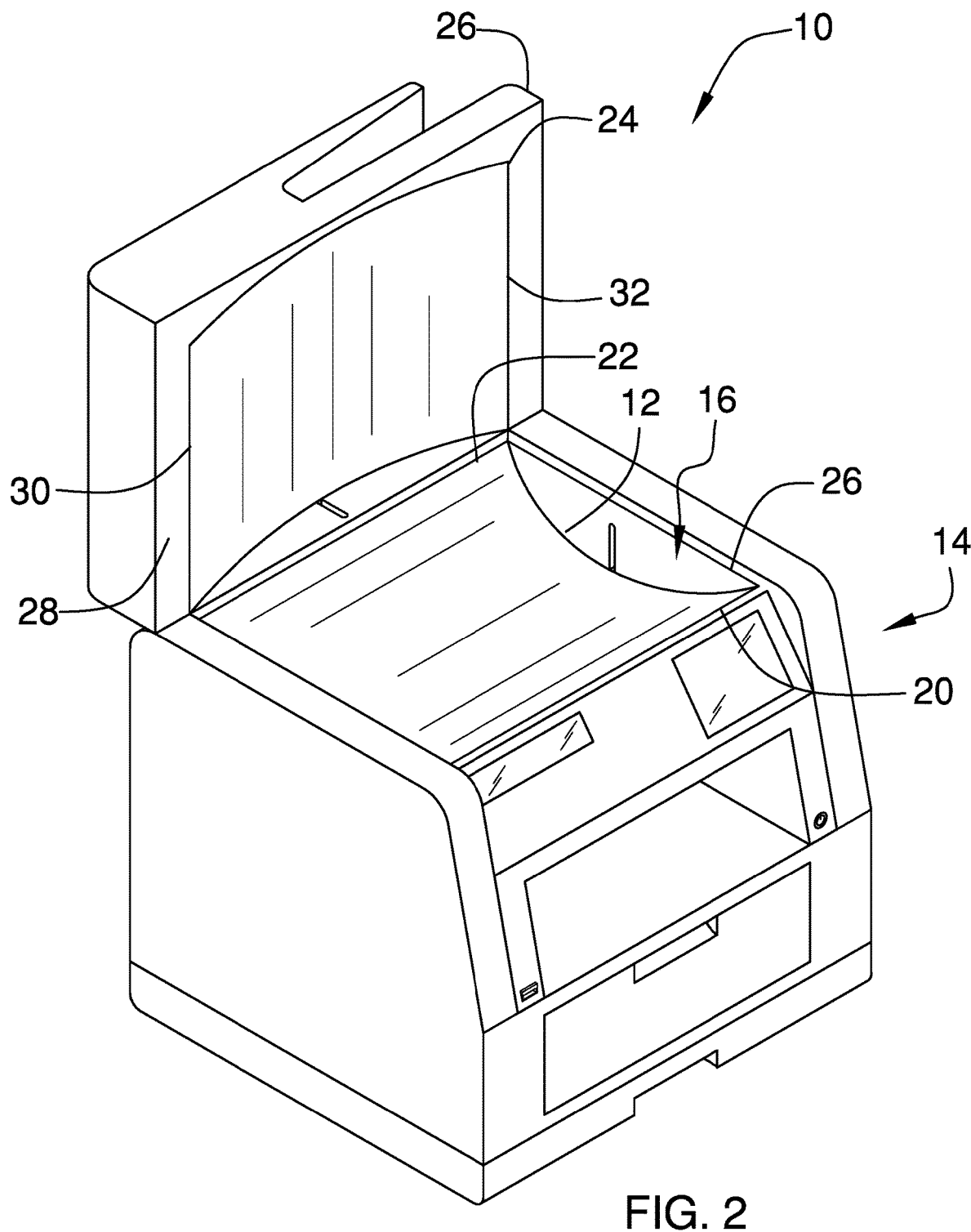
FIG. 2 is a perspective view of an embodiment of the disclosure showing a scanning lid being opened.
Figure 3:
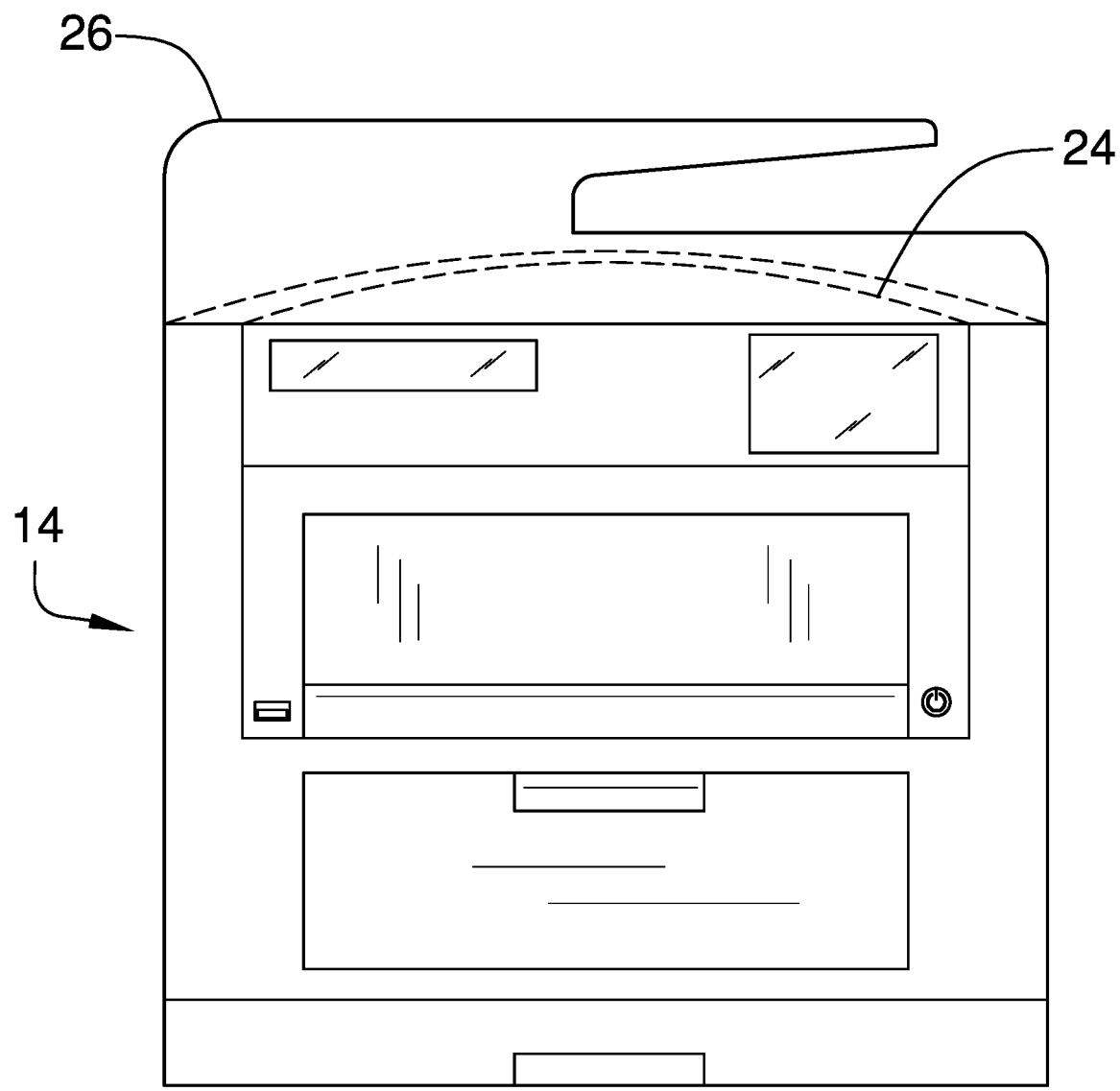
FIG. 3 is a front phantom view of an embodiment of the disclosure.
Figure 4:
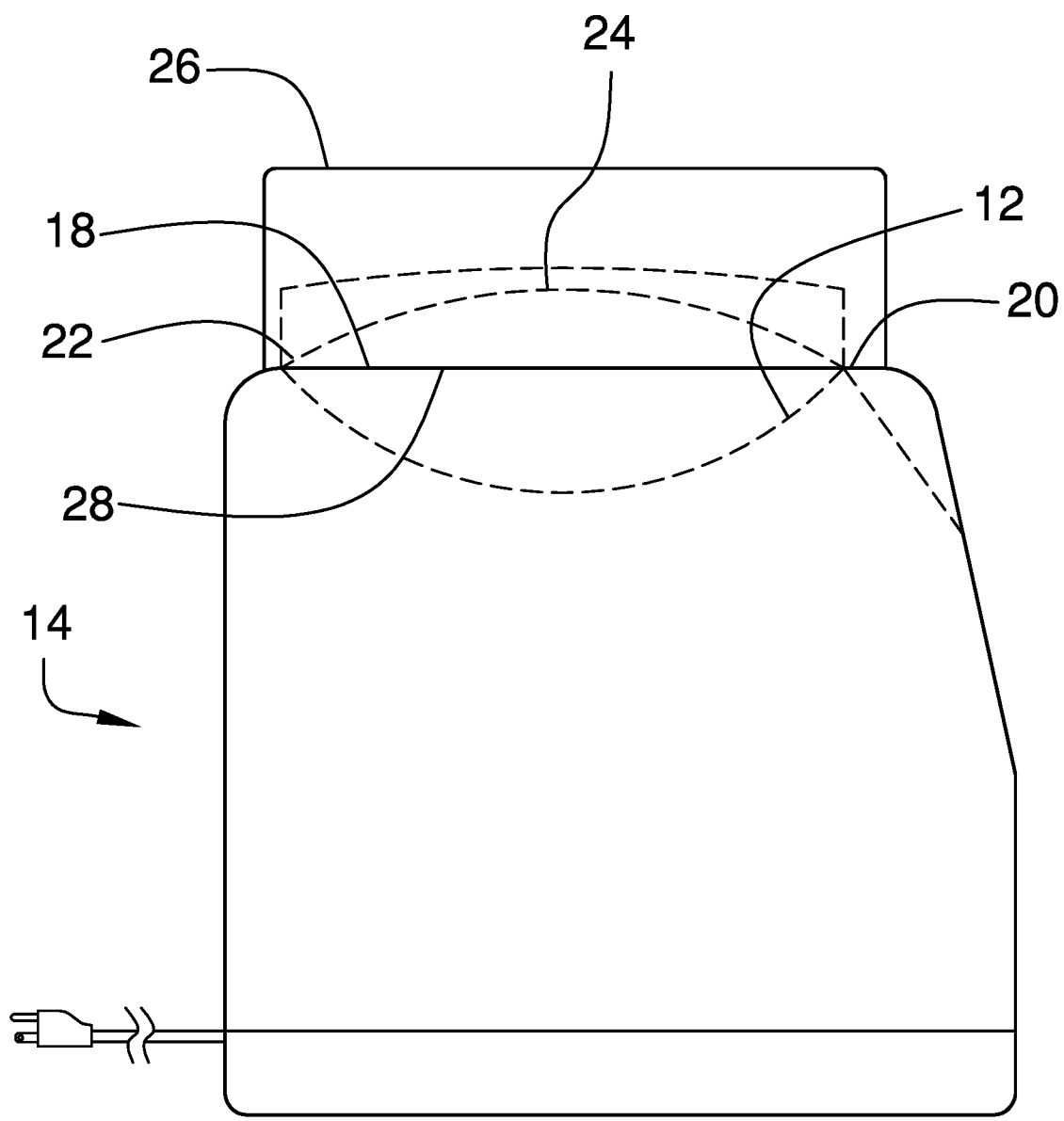
FIG. 4 is a right side phantom view of an embodiment of the disclosure.

With reference now to the drawings, and in particular to FIGS. 1 through 4 thereof, a new scanner device embodying the principles and concepts of an embodiment of the disclosure and generally designated by the reference numeral 10 will be described.

As best illustrated in FIGS. 1 through 4, the three dimensional scanner assembly 10 generally comprises a scanning panel 12 that is positioned on a copying machine 14. The copying machine 14 may be an electronic scanner/printer of any conventional design. An object can be placed on the scanning panel 12 thereby facilitating the copying machine 14 to scan an image of the object. Moreover, the scanning panel 12 is comprised of a resiliently flexible material thereby facilitating the scanning panel 12 to conform to the curvature of a rounded or otherwise bulky object. In this way the copying machine 14 can scan a majority of an outer surface of the rounded or otherwise bulky object by urging a scanning bar along the curvature formed in the scanning panel 12. Thus, the copying machine 14 can reproduce a two dimensional print of a three dimensional object in a single scan.

The scanning panel 12 is positioned on a top 16 of a scanning bed 18 of the copying machine 14. The scanning panel 12 is comprised of a translucent material to pass light therethrough. In this way the copying machine 14 can scan the rounded or otherwise bulky object. The scanning panel 12 has a front edge 20 and a back edge 22, and the scanning panel 12 may be concavely arcuate between the front 20 and back 22 edges. In this way the rounded or otherwise bulky can sit in the scanning panel 12.

A lid panel 24 is provided and the lid panel 24 is positioned on a scanning lid 26 of the copying machine 14. In this way the lid panel 24 can be positioned on top of the object that is placed on the scanning panel 12. The lid panel 24 is comprised of a resiliently flexible material. In this way the lid panel 24 can conform to the curvature of the rounded or otherwise bulky object thereby facilitating the scanning lid 26 to be closed on the rounded or otherwise bulky object. The lid panel 24 is positioned on a bottom side 28 of the scanning lid 26, and the scanning lid 26 rests on the scanning bed 18 when the scanning lid 26 is closed. The lid panel 24 has a first lateral edge 30 and a second lateral edge 32, and the lid panel 24 may be concavely arcuate between the first 30 and second lateral 32 edges. In this way the lid panel 24 can accommodate the rounded or otherwise bulky object when the scanning lid 26 is closed.

In use, the rounded of otherwise bulky object is placed on the scanning panel 12 and the scanning lid 26 is closed. Thus, each of the scanning panel 12 and the lid panel 24 deform to conform to the curvature of the rounded or otherwise bulky object. The scanning bar of the copying machine 14 travels along the curvature formed in the scanning panel 12 when the copying machine 14 is turned on the scan the rounded or otherwise bulky object. In this way the entirety of a label on a medication bottle, for example, can be fully scanned in a single pass, thereby facilitating the label on the medication bottle to be printed in its entirety.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A three dimensional scanner assembly being configured to scan a three dimensional object for subsequent reproduction in a two dimensional print, said assembly comprising:
   a scanning panel being positioned on a copying machine wherein said scanning panel is configured to have an object placed thereon thereby facilitating the copying machine to scan an image of the object, said scanning panel being comprised of a resiliently flexible material wherein said scanning panel is configured to conform to the curvature of a rounded or otherwise bulky object thereby facilitating the copying machine to scan a majority of an outer surface of the rounded or otherwise bulky object, wherein the copying machine is facilitated to reproduce a two dimensional print of a three dimensional object in a single scan; and
   a lid panel being positioned on a scanning lid of the copying machine wherein said lid panel is configured to be positioned on top of the object that is placed on said scanning panel.

2. The assembly according to claim 1, wherein said scanning panel is positioned on a top of a scanning bed of the copying machine.

3. The assembly according to claim 2, wherein said scanning panel is comprised of a translucent material wherein said scanning panel is configure to pass light therethrough thereby facilitating the copying machine to scan the rounded or otherwise bulky object.

4. The assembly according to claim 1, wherein said lid panel is comprised of a resiliently flexible material wherein said lid panel is configured to conform to the curvature of the rounded or otherwise bulky object thereby facilitating said scanning lid to be closed on the rounded or otherwise bulky object.

5. The assembly according to claim 4, wherein said lid panel being positioned on a bottom side of the scanning lid.

6. A three dimensional scanner assembly being configured to scan a three dimensional object for subsequent reproduction in a two dimensional print, said assembly comprising:
   a scanning panel being positioned on a copying machine wherein said scanning panel is configured to have an object placed thereon thereby facilitating the copying machine to scan an image of the object, said scanning panel being comprised of a resiliently flexible material wherein said scanning panel is configured to conform to the curvature of a rounded or otherwise bulky object thereby facilitating the copying machine to scan a majority of an outer surface of the rounded or otherwise bulky object, wherein the copying machine is facilitated to reproduce a two dimensional print of a three dimensional object in a single scan, said scanning panel being positioned on a top of a scanning bed of the copying machine, said scanning panel being comprised of a translucent material wherein said scanning panel is configure to pass light therethrough thereby facilitating the copying machine to scan the rounded or otherwise bulky object; and
   a lid panel being positioned on a scanning lid of the copying machine wherein said lid panel is configured to be positioned on top of the object that is placed on said scanning panel, said lid panel being comprised of a resiliently flexible material wherein said lid panel is configured to conform to the curvature of the rounded or otherwise bulky object thereby facilitating said scanning lid to be closed on the rounded or otherwise bulky object, said lid panel being positioned on a bottom side of the scanning lid.

7. The assembly according to claim 6, wherein said scanning panel has a front edge and a back edge, said scanning panel being concavely arcuate between said front and back edges wherein said scanning panel is configured to have the rounded or otherwise bulky object positioned thereon.

8. The assembly according to claim 6, wherein said lid panel has a first lateral edge and a second lateral edge, said lid panel being concavely arcuate between said first and second lateral edges wherein said lid panel is configured to accommodate the rounded or otherwise bulky object when the scanning lid is closed.

9. A method of scanning a three dimensional object for subsequent reproduction in a two dimensional print, the steps of the method comprising:
   providing a scanning panel being comprised of a resiliently flexible material;
   positioning said scanning panel on top of a scanning bed of a copying machine;
   providing a lid panel being comprised of a resiliently flexible material;
   positioning said lid panel on a bottom side of a scanning lid of the copying machine;
   placing a three dimensional object on said scanning panel such that said scanning panel deforms to conform to the shape of the three dimensional object;
   closing the scanning lid of the copying machine such that said lid panel deforms to conform to the shape of the three dimensional object; and actuating the copying machine to scan and subsequently reproduce a two dimensional print of the three dimensional object.

* * * * *